United States Patent [19]

Lessmann et al.

[11] 4,346,279
[45] Aug. 24, 1982

[54] NARROW GAP WELDING TORCH WITH REPLACEMENT TIP

[75] Inventors: Gerald G. Lessmann, Pittsburgh, Pa.; Ronald P. Simpson, Old Saybrook, Conn.; Ronald D. O'Brokta, Allegheny Township, Armstrong County, Pa.

[73] Assignee: Westinghouse Electric Corp., Pittsburgh, Pa.

[21] Appl. No.: 143,207

[22] Filed: Apr. 24, 1980

[51] Int. Cl.³ .............................................. B23K 9/16
[52] U.S. Cl. .................................. 219/75; 219/137.42
[58] Field of Search .................... 219/74, 75, 137.42, 219/137.63

[56] References Cited

U.S. PATENT DOCUMENTS

| | | |
|---|---|---|
| 3,123,702 | 3/1964 | Keidel et al. ............................ 219/74 |
| 3,180,967 | 4/1965 | Hill ........................................ 219/75 |
| 3,826,888 | 7/1974 | Garfield et al. ............. 219/137.42 X |
| 3,924,095 | 12/1975 | Lucas, Jr. ........................... 219/74 X |
| 4,057,704 | 11/1977 | Geus et al. ............................ 219/75 |
| 4,110,590 | 8/1978 | Batey et al. .......................... 219/75 |
| 4,145,595 | 3/1979 | Keller et al. .......................... 219/75 |

FOREIGN PATENT DOCUMENTS 137202  8/1979  German Democratic Rep. ... 219/75

Primary Examiner—J. V. Truhe
Assistant Examiner—Keith E. George
Attorney, Agent, or Firm—F. J. Baehr, Jr.

[57] ABSTRACT

A narrow groove welding torch having an inexpensive rugged easily replaceable ceramic tip having a rectangular cross section with blanketing ducts disposed therein and springs which fit over hooks to hold the tip in place on the welding torch.

2 Claims, 2 Drawing Figures

NARROW GAP WELDING TORCH WITH REPLACEMENT TIP

BACKGROUND OF THE INVENTION

This invention relates to a welding torch for producing narrow groove welds and more particularly to a welding torch with a removable ceramic tip.

Ceramic tips disposed on welding torches provide excellent thermal and dielectric properties, however, they are subject to damage when they come in contact with the workpiece. Thus, they must be easily replaced and inexpensive so as to be expendable if the welding torch is to be maintained in its peak operating condition.

SUMMARY OF THE INVENTION

In general, a narrow groove welding torch, when made in accordance with this invention, comprises an electrode holder having a rectangular cross-section with cooling ducts disposed therein and a replaceable tip detachably connected to the electrode and having a generally rectangular shaped cross-section and shielding gas ducts disposed therein.

BRIEF DESCRIPTION OF THE DRAWINGS

The objects and advantages of this invention will become more apparent from reading the following detail description in connection with the accompanying drawings, in which.

DESCRIPTION OF THE PREFERRED EMBODIMENT

Figures 1, 2:
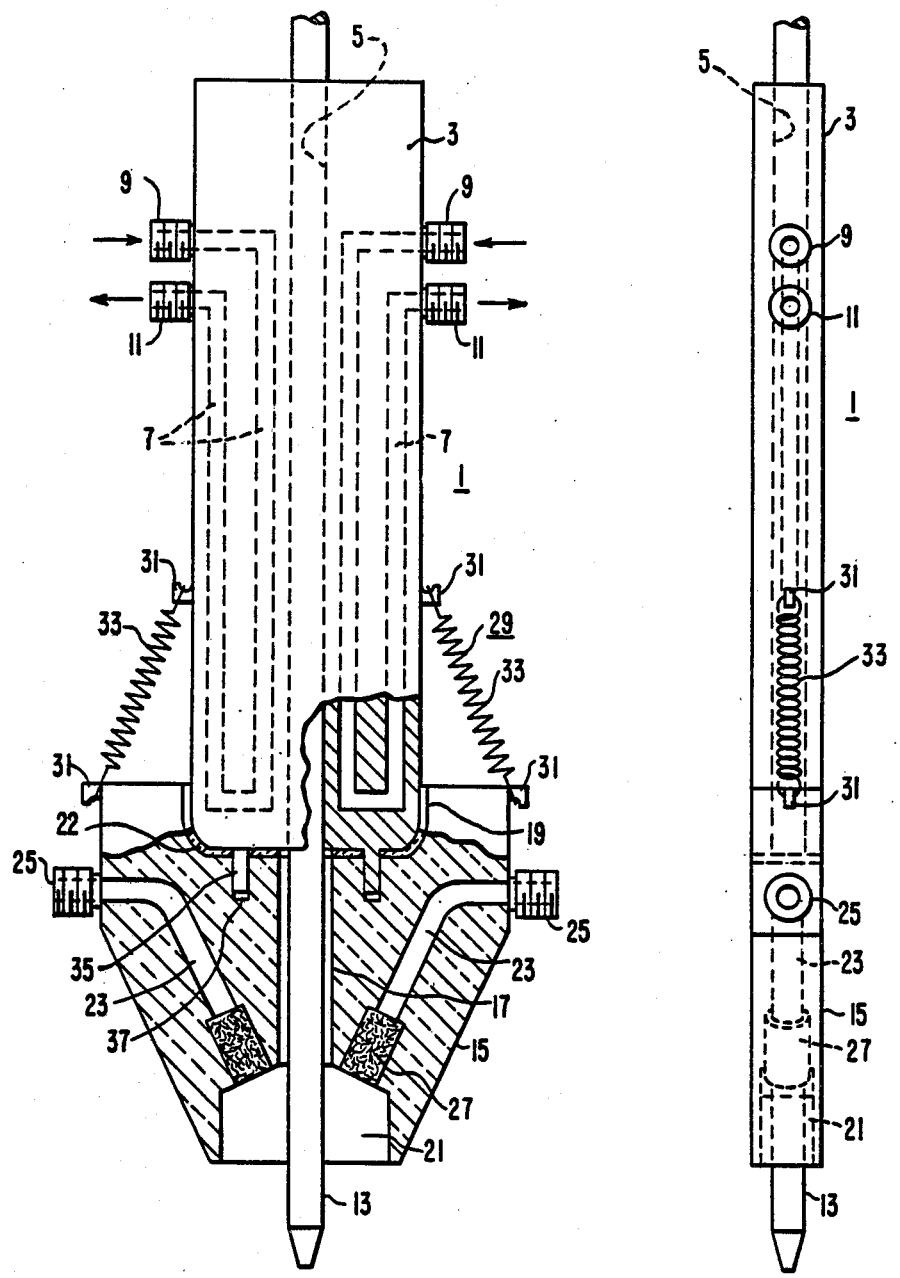
FIG. 1 is a front elevational view of a welding torch made in accordance with this invention.
FIG. 2 is a side elevational view of the torch.

The torch 1 comprises an elongated metallic electrode holder 3 made of copper or other good conducting material and having a generally rectangular cross-section with a centrally longitudinally disposed opening 5 extending therethrough. Cooling ducts 7 are disposed adjacent the leading and trailing sides of the electrode holder 3, each duct making two passes within the electrode holder 3. Inlet and outlet nozzles 9 and 11, respectively, are disposed on the leading and trailing sides of the electrode holder 3 and are threaded to connect to a cooling water supply system, not shown. A tungsten electrode 13 is disposed in the central opening 5 and extends therethrough.

A replaceable tip 15 made of a ceramic material is detachably connected to the lower end of the electrode holder 3. The tip 15 has a generally rectangular cross-section and a centrally disposed bore 17 through which the electrode 13 passes. Both ends of the bore 17 are counterbored to form generally rectangular shaped openings 19 and 21. The upper counterbore 19 has insulating packing 22 disposed therein and is adapted to receive the electrode holder 3. Blanketing or shielding gas ducts 23 are disposed adjacent the leading and trailing sides of the tip 15 and have inlet nozzles 25 disposed on the upper side of the tip 15. The ducts 23 discharge into the counterbore 21 at the lower end of the tip 15. Diffusers 27 are disposed in the shielding or blanketing gas ducts 23 adjacent the discharge end thereof.

Latching means 29 detachably hold the tip 15 against the electrode holder 3. The latching means 29 comprises knobs or hooks 31 disposed on both the electrode holder 3 and the tip 15 and springs 33 which loop over the hooks 31 to detachably hold the tip 15 against the electrode holder 3. Pins 35 on the electrode holder and alignment holes 37 in the tip 15 cooperate to insure proper alignment of the tip 15 and electrode holder 3 when they are detachably held together.

The narrow groove welding torch hereinbefore described advantageously provides an inexpensive easily replaceable tip made of a ceramic material which will withstand high temperatures and is an electrical insulator.

What is claimed is:

1. A narrow groove welding torch comprising an electrode holder having a rectangular cross-section with cooling ducts disposed within the electrode holder and a replaceable tip disposed on one end of the electrode holder, the tip having a generally rectangular cross-section, a centrally disposed opening extending through the tip with rectangular shaped counterbores on each end of the opening, blanketing gas ducts are disposed in the tip and extend from leading and trailing sides of the tip into one of the counterbores, the ducts having diffusers disposed therein adjacent one of the counterbores to supply a gentle flow of shielding gas to one of the counterbores, the other counterbore receiving the electrode holder and having insulating packing disposed therein between the electrode holder and the tip, and the tip being detachably attached to the electrode holder and being held to the electrode holder by springs which fit over hooks disposed on both the electrode holder and the replaceable tip.

2. A narrow groove welding torch as set forth in claim 1, wherein the replaceable tip is made of a ceramic material.

* * * * *